United States Patent
Hayashi

(10) Patent No.: US 8,134,326 B2
(45) Date of Patent: Mar. 13, 2012

(54) MOTOR DRIVE APPARATUS AND METHOD FOR ELECTRIC POWER STEERING SYSTEM

(75) Inventor: Yoshitaka Hayashi, Obu (JP)

(73) Assignee: Denso Corporation, Kariya (JP)

( * ) Notice: Subject to any disclaimer, the term of this patent is extended or adjusted under 35 U.S.C. 154(b) by 563 days.

(21) Appl. No.: 12/335,745

(22) Filed: Dec. 16, 2008

(65) Prior Publication Data

US 2009/0200975 A1    Aug. 13, 2009

(30) Foreign Application Priority Data

Feb. 8, 2008    (JP) .................................. 2008-28936

(51) Int. Cl.
    G05B 11/28    (2006.01)
(52) U.S. Cl. ........................................ 318/599; 318/811
(58) Field of Classification Search ................. 318/801, 318/599, 811, 807
    See application file for complete search history.

(56) References Cited

U.S. PATENT DOCUMENTS

| | | | | |
|---|---|---|---|---|
| 4,847,743 A | * | 7/1989 | Kamiyama ...................... | 363/41 |
| 5,614,803 A | * | 3/1997 | Morioka et al. ............... | 318/801 |
| 5,852,551 A | * | 12/1998 | Lee ................................. | 363/39 |
| 6,060,859 A | * | 5/2000 | Jonokuchi ...................... | 318/801 |
| 6,639,379 B2 | * | 10/2003 | Matsushita et al. ........... | 318/727 |
| 6,798,161 B2 | * | 9/2004 | Suzuki .......................... | 318/434 |
| 6,864,662 B2 | * | 3/2005 | Recker .......................... | 318/807 |
| 7,053,587 B2 | * | 5/2006 | Ito et al. ........................ | 318/801 |
| 7,294,988 B2 | * | 11/2007 | Ajima et al. ................... | 318/712 |

FOREIGN PATENT DOCUMENTS

| | | |
|---|---|---|
| EP | 1 887 684 | 2/2008 |
| JP | 2002-345283 | 11/2002 |
| JP | 2004-048885 | 2/2004 |
| JP | 2004-231170 | 8/2004 |
| JP | 2005-176565 | 6/2005 |

OTHER PUBLICATIONS

Japanese Office Action dated Dec. 15, 2009, issued in corresponding Japanese Application No. 2008-028936, with English translation.
Japanese Office Action dated Aug. 26, 2010, issued in corresponding Japanese Application No. 2008-028936, with English translation.

* cited by examiner

*Primary Examiner* — Rina Duda
(74) *Attorney, Agent, or Firm* — Nixon & Vanderhye P.C.

(57) ABSTRACT

In a motor drive apparatus for an EPS motor, which provides steering assist torque in an electric power steering system, a three-phase inverter applies three phase-voltages to the EPS motor, and a controller controls the three-phase inverter. The controller drives the EPS motor by implementing a two-phase modulation method and a three-phase modulation method, when at least one of the assist torque, a steering angle acceleration and a function value of a predetermined function is greater and less than a predetermined threshold value indicative of a rapid steering operation, respectively.

2 Claims, 2 Drawing Sheets

ND METHOD
MOTOR DRIVE APPARATUS AND METHOD FOR ELECTRIC POWER STEERING SYSTEM

CROSS REFERENCE TO RELATED APPLICATION

This application relates to and incorporates herein by reference Japanese Patent Application No. 2008-28936 filed on Feb. 8, 2008.

FIELD OF THE INVENTION

The present invention relates to a motor drive apparatus and method for an electric power steering system of a vehicle.

BACKGROUND OF THE INVENTION

In many conventional electric power steering systems (EPS), a brushless DC motor is used as an EPS motor. The brushless DC motor generates no brush sliding noises It is of course possible to use AC motors as EPS motors. It is however generally recognized that the brushless DC motor is most suitable for the electric power steering systems, because it is not only compact in size but has large torque, small loss and small cogging torque.

The brushless DC motor is a magnet-rotor synchronous motor, which is driven by an inverter. The inverter is conventionally driven by a 120°-energization method, a 180°-energization method or a sine-wave energization method. Here, the brushless DC motor is not limited to a type of rectangular-wave energization method. The EPS motor is generally driven by a sine-wave modulation method to reduce vibrations, which a driver will sense, because the sine-wave modulation method reduces torque ripples, noises and vibrations.

As other modulation methods, a two-phase modulation method and a trapezoid-wave modulation method are known. In the two-phase modulation method, the inter-phase voltage waveform is maintained in a sine waveform by fixing one phase potential and modulating the remaining two phase potentials in sine-wave. In the trapezoid-wave modulation method, harmonic waves of odd-number orders are added to a sine-wave phase voltage. These two-phase modulation method and the trapezoid-wave modulation method are advantageous in producing more torque than by the sine-wave modulation method.

In one two-phase modulation method, that is a conventional $\pi/3$ fixing method, each phase voltage is fixed to a high potential level and a low potential level for an electric angle of 60° ($\pi/3$) alternately by sequentially turning on switching elements of an inverter for a predetermined period while maintaining an inter-phase voltage. This method reduces the switching loss of the inverter.

U.S. Pat. No. 4,847,743 (JP 2,577,738) proposes another two-phase modulation method, that is, a $2\pi/3$ fixing method, in which each phase voltage is fixed to a high potential level and a low potential level for an electric angle of 120° ($2\pi/3$). This method also reduces the switching loss of the inverter. It also proposes to apply three phase-voltages to the motor by stopping the two-phase modulation method, when the amplitude of the phase voltage is small.

U.S. Pat. No. 7,053,587 (JP 2005-229676A) proposes that a two-phase modulation method is implemented when a phase current is large, and a three-phase modulation method is effected when the phase current is small. This method also reduces the switching loss.

It is desired that the brushless DC motor used as the EPS motor generates vibration and noise that will be transferred to a driver through a steering shaft as little as possible. In this respect, although the two-phase modulation method produces large torque, it generates large vibration and noise due to distortion of waveform and hence is not suited for use as the EPS motor. Although the three-phase sine-wave modulation method is most suited to reduce vibration and noise, the motor becomes large in size to ensure large torque and hence has poor response characteristics due to increased rotor inertial mass.

SUMMARY OF THE INVENTION

It is therefore an object of the present invention to provide a motor drive apparatus and method for an electric power steering system, which is compact in size and improves response while suppressing, vibration and noise.

According to one aspect, a motor drive apparatus for an electric power steering system comprises a three-phase inverter for applying three phase-voltages to an AC motor, and a controller for controlling the three-phase inverter. The controller is configured to drive the AC motor by implementing a two-phase modulation method and a three-phase modulation method, when a steering operation is rapid and normal, respectively.

The steering operation may be determined to be rapid and normal, when at least one of the assist torque, a steering angle acceleration and a function value of a predetermined function is greater and less than a predetermined threshold value. The predetermined function is defined to have a direct correlation to the rapid steering operation and use assist torque and steering angle acceleration as variables.

The AC motor may be a synchronous motor having a magnet rotor. The controller maybe configured to drive the AC motor by implementing the three-phase modulation method, when a phase current flowing in the inverter is less than a predetermined threshold current. Further, the controller may be configured to calculate a q-axis current or a function value, which has a direct correlation to the q-axis current, and drive the AC motor by implementing the three-phase modulation method when the q-axis current or the function value is less than a predetermined threshold value. It is noted that, as known well, the q-axis current command value and the q-axis voltage command value have direct correlation to the assist torque. In addition, the rapid steering operation may be detected based on a current vector amplitude (current vector length) calculated by using one phase-current and a rotational angle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
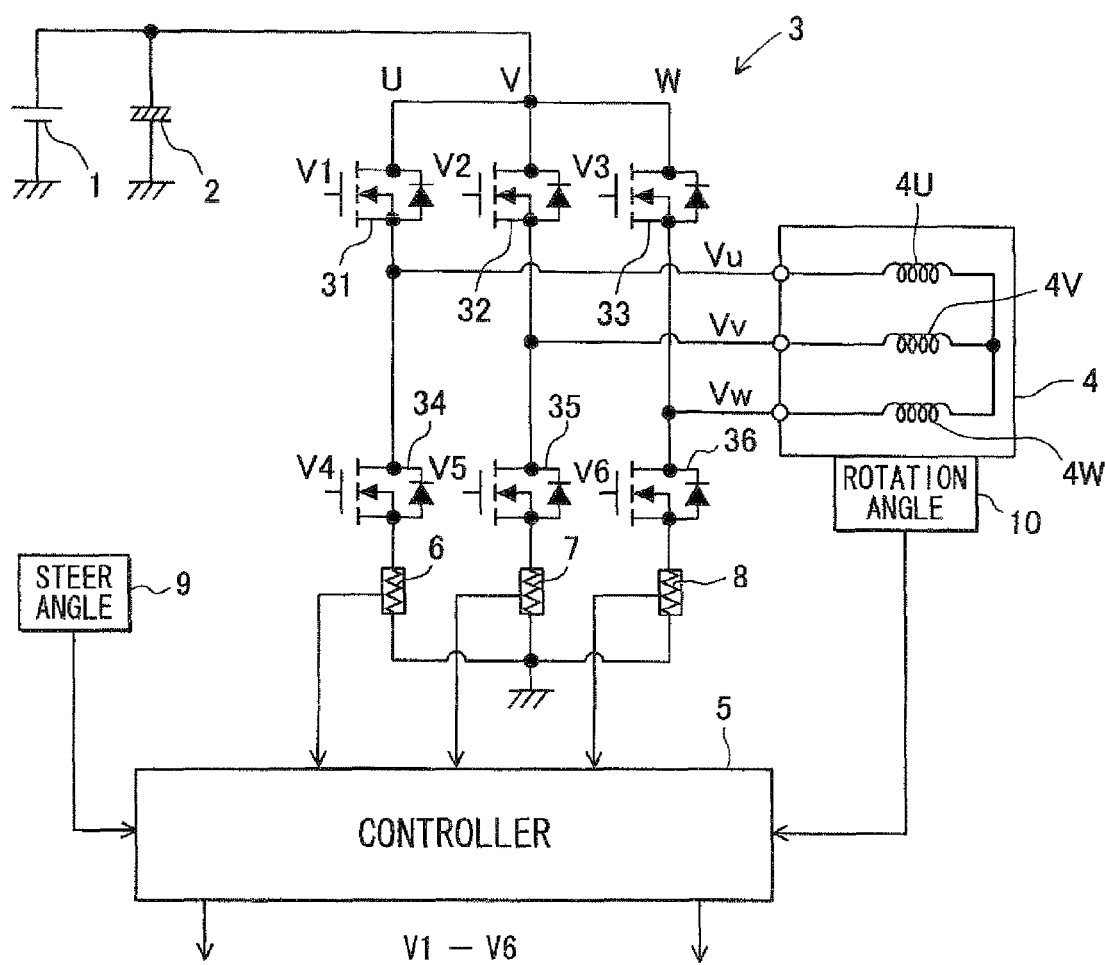
FIG. 1 is a schematic diagram showing a motor drive apparatus for an electric power steering system according to an embodiment of the present invention.

A motor drive apparatus for an electric power steering system of a vehicle will be described in more detail with reference to an embodiment shown in FIG. 1.

The electric power steering system includes a DC power source (battery) 1, a smoothing capacitor 2, a three-phase inverter 3, an EPS motor 4 using a brushless DC motor, an electronic controller 5, current sensors 6 to 8, a steering angle sensor 9 for detecting angle of steering shaft (not shown) indicating an angle of steering wheel operation of a driver, and a rotation angle sensor 10 mounted in the EPS motor 4. The three current sensors may be reduced to two, so that one of three phase-currents may be calculated from detected two phase-currents.

The DC power source 1 is provided to supply a DC voltage to the three-phase inverter 3 through a pair of DC power cables. The capacitor 2 is connected in parallel to the DC power source 1 to smooth the voltage and the current supplied from the power source 1 to the inverter 3, etc. The three-phase inverter 3 has half-bridges of U-phase, V-phase and W-phase, which are connected in parallel. The U-phase half-bridge includes an upper arm (high potential-side) element 31 and a lower arm (lower potential-side) element 34 connected in series. The V-phase half-bridge includes an upper arm element 32 and a lower arm element 35 connected in series. The W-phase half-bridge includes an upper arm element 33 and a lower arm element 36 connected in series.

Each of the upper arm elements 31 to 33 and the lower arm elements 34 to 36 is formed by an nMOS transistor with a flywheel diode. The flywheel diode is a Shottky diode and connected in parallel and in reverse-biased direction to the nMOS transistor. The upper arm elements 31 to 33 are in the source-follower configuration and the lower arm elements 34 to 36 are in the source-grounded configuration.

Three phase-voltages Vu, Vv, Vw produced by the half bridges are applied to corresponding phase windings 4U, 4V, 4W of the EPS motor 4, respectively. The phase windings 4U, 4V, 4W are star-connected. The EPS motor 4 may be a surface permanent magnet rotor-type synchronous motor (SPM) or an interior permanent magnet rotor-type synchronous motor (IPM), which is capable of using reluctance torque. The inverter 3 and the EPS motor 4 are known in the art with respect to both configuration and operation.

The current sensors 6 to 8 are resistors of low resistance connected between the source electrodes of the lower arm elements 34 to 36 and the ground, respectively The current sensors 6 to 8 apply voltages, which correspond to phase currents flowing therein, respectively, to the controller 5.

The controller 5 is configured and programmed to calculate required steering assist torque based on the steering angle detected by the steering angle sensor 9, calculate a current command value (q-axis current command value) corresponding to a command value of the calculated assist torque, and feedback-controls three phase-currents of the three-phase inverter 3 to produce three phase-currents corresponding to the current command value.

Specifically, the current feed-back control is performed by converting the three phase-current command values and the three phase-current detection values to corresponding values of rotational coordinates based on the rotation angle θ of the EPS motor 4 detected by the rotation angle sensor 10, and duty of pulse width modulation (PWM) of each arm element 31 to 36 of the three-phase inverter 3 is calculated and output to the corresponding arm element as signals V1 to V6. This control is known well in the art as vector control, and no further description will not be made for brevity.

The controller 5 performs a three-phase sine-wave modulation mode (three-phase modulation mode) and a two-phase modulation mode. In the three-phase modulation mode, the arm elements 31 to 36 of the three-phase inverter 3 are PM-controlled at a predetermined PWM carrier frequency (e.g., 15 kHz). Thus, the three phase-voltages applied from the three-phase inverter 3 to the EPS motor 4 are modulated into the sine waveform. In the two-phase modulation mode, one of the three phases is sequentially fixed to 100% PWM duty or a predetermined PWM duty (0%+α) and the other two phases are applied with the same PWM duties. Thus, the inter-phase voltages are maintained in the sine waveform.

The controller 5 commands the three-phase inverter 3 to drive the EPS motor 4 to operate in the selected one of the three-phase modulation mode and the two-phase modulation mode. When the three-phase inverter 3 is thus controlled to drive the EPS motor 4 in either the three-phase modulation mode or the two-phase modulation mode, three phase-voltages produced by the three-phase modulation or the two-phase modulation are applied to the phase windings 4U, 4V and 4W of the EPS motor 4. Generation of three phase-voltages by the three-phase modulation mode or the two-phase modulation mode are known well in the art, and hence no further explanation will be made for brevity.

Figure 2:
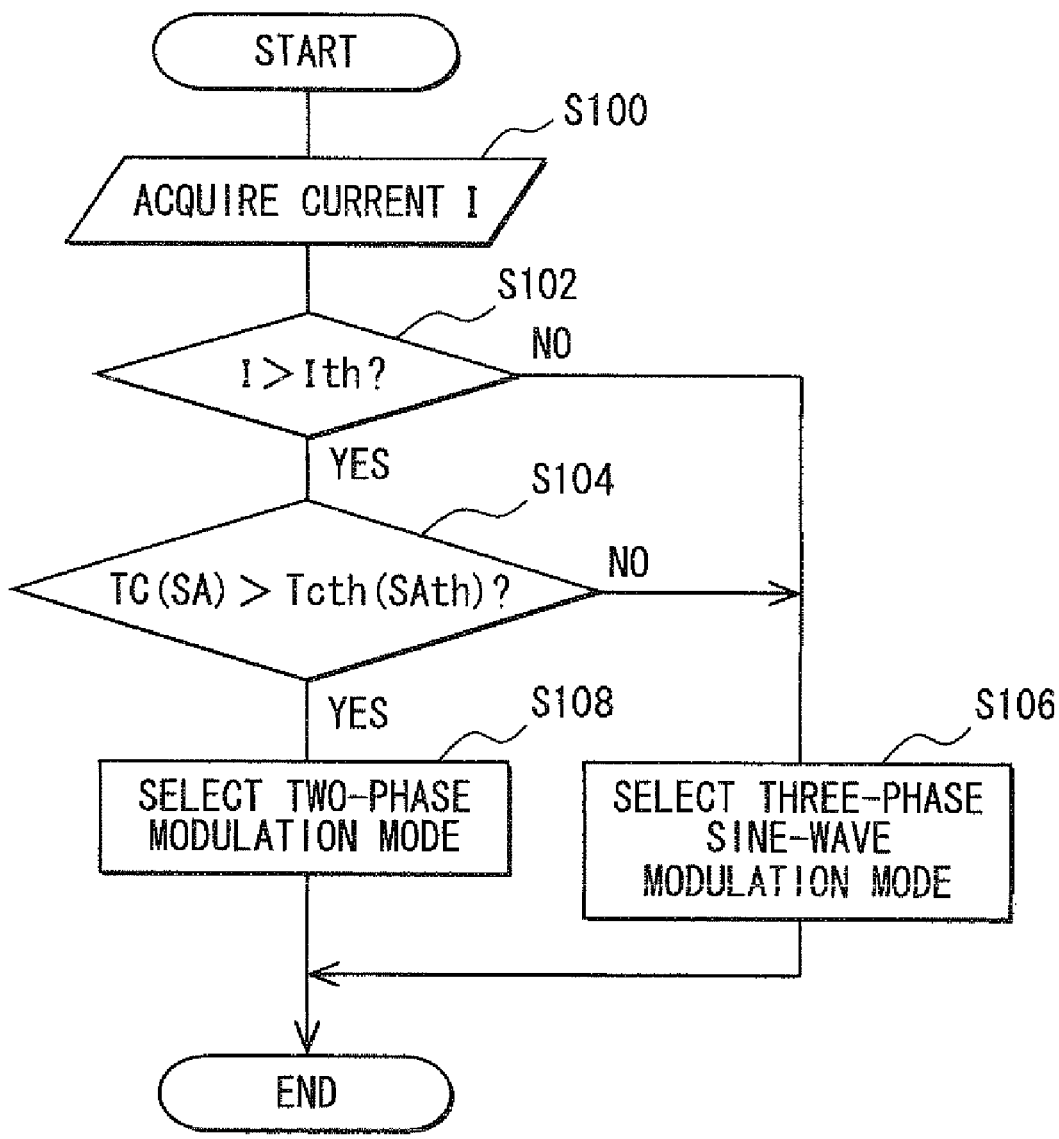
FIG. 2 is a flowchart showing processes for switching over an operation mode of a controller in the embodiment shown in FIG. 1.

The controller 5 is programmed to switch over the modulation mode between the three-phase modulation mode and the two-phase modulation mode as shown in FIG. 2.

First, phase-currents detected by the current sensors 6 to 8 are acquired (S100), and the current I corresponding to a current vector amplitude is calculated from the acquired phase currents. It is checked whether this current I is greater than a predetermined threshold current Ith (S102). This threshold current Ith is set to correspond to a required minimum level, below which accuracy of the detected phase current will be too low. This threshold current Ith may be determined empirically.

If the check result at S102 is NO, the three-phase modulation mode is selected as a mode for driving the three-phase inverter 3 (S106).

If the check result at S102 is YES, it is further checked whether a torque command value Tc or a steering angle acceleration (change rate) SA is greater than a predetermined value Tcth or SAth (S104). This is for checking whether the steering wheel operation is in a rapid steering operation, because the assist torque and the steering angle acceleration vary with steering operation condition. These values Tc or SA may be calculated based on various parameters detected by various sensors and applied to the controller 5.

For example, the torque command value Tc may be calculated by inputting the torque detected by a torque sensor (not shown) provided on the steering shaft into a predetermined function (equation), which is prestored in the controller 5. The steering angle acceleration SA may be calculated by differentiating the steering angle detected by the steering angle sensor 9.

If the check result at S104 is NO, the three-phase modulation mode is selected for driving the three-phase inverter 3 by implementing the three-phase modulation method (S106). If the check result is YES at S104, the two-phase modulation mode is selected as a mode for driving the three-phase inverter 3 by implementing the two-phase modulation method (S108). The three phase inverter 3 is controlled by the controller 5 in the selected modulation mode.

According to the above operation, the EPS motor 4 is driven in the two-phase modulation mode in the rapid steering condition, in which large steering torque and good steering response characteristics are required. The EPS motor 4 is driven in the three-phase modulation mode in the normal steering condition, in which no or only slow steering is required and hence low noise and low vibration are required.

Further, the motor size and the rotor inertial moment can be reduced owing to an increase of the assist torque provided by implementing the two-phase modulation method.

The above embodiment may be modified in various ways.

For example, at the check processes of S102 and S104, it may be checked whether the q-axis current or a function value, which has a direct correlation to the q-axis current, is greater than a predetermined threshold value. If the check result is YES and NO, the two-phase modulation mode and the three-phase modulation mode are selected, respectively.

Here, the q-axis current or the function value having the direct correlation to the q-axis current may be a q-axis current calculation value calculated from the detected phase-current, a q-axis torque command value generally proportional to the calculated assist torque, a q-axis voltage command value having a direct correlation to the q-axis torque command value, or a current vector length. The current vector length is calculated as a sum of a square value of the q-axis current and a square value of a d-axis current, a square root of the sum of the square value of the q-axis current and the square value of the d-axis current, the q-axis voltage command value, a sum of a square value of the q-axis voltage command value and a square value of the d-axis voltage command value, a square root of the sum of the square value of the q-axis voltage command value and the square value of the d-axis voltage command value, or a value which results from a division of the square root of the sum of the square value of the q-axis voltage command value and the square value of the d-axis voltage command value by a power source voltage value. These calculations can be made in the normal motor vector control.

According to the above embodiment, in the rapid steering operation condition in which the driver will not sense large vibration and large noise so much, large steering assist torque can be provided by implementing the two-phase modulation method. In the normal steering operation in which the driver will sense vibration and noise and notice torque assist error, smooth torque assist as well as low noise and low vibration can be attained by implementing the three-phase modulation method which provides high accuracy in the calculation of the assist torque.

What is claimed is:

1. A motor drive apparatus for an electric motor, which provides steering assist torque in an electric power steering system, the motor drive apparatus comprising:
   a three-phase inverter for applying three phase-voltages of three phases to the motor, the three-phase inverter having an upper arm element and a lower arm element connected in series in each phase;
   a current detection sensor for detecting a phase current flowing in the lower arm element in each phase; and
   a controller for controlling the three-phase inverter, wherein:
   the controller is configured to calculate a q-axis current or a function value, which has a direct correlation to the q-axis current,
   the controller is configured to control the three-phase inverter to implement a three-phase sine-wave modulation method when the q-axis current or the function value is less than a predetermined threshold value,
   the controller is configured to control the three-phase inverter to implement a two-phase modulation method when the phase current detected by the current detection sensor is greater than a predetermined threshold current and the q-axis current or the function value is greater than a predetermined threshold value,
   the controller is configured to control the three-phase inverter to implement the three-phase sine-wave modulation method when the phase current detected by the current detection sensor is greater than the predetermined threshold current and the q-axis current or the function value is less than the predetermined threshold value, and
   the controller is configured to control the three-phase inverter to implement the three-phase sine-wave modulation method irrespective of the q-axis current or the function value relative to the predetermined threshold value when the phase current detected by the current detection sensor is less than the predetermined threshold current.

2. The motor drive apparatus according to claim 1, wherein the motor is a synchronous motor having a magnet rotor.

* * * * *